United States Patent
Wang et al.

(10) Patent No.: US 12,164,929 B2
(45) Date of Patent: Dec. 10, 2024

(54) INFORMATION PROCESSING METHOD AND ELECTRONIC APPARATUS

(71) Applicant: Lenovo (Beijing) Limited, Beijing (CN)

(72) Inventors: Haitao Wang, Beijing (CN); Haiyang He, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 312 days.

(21) Appl. No.: 17/474,223

(22) Filed: Sep. 14, 2021

(65) Prior Publication Data
US 2022/0206823 A1    Jun. 30, 2022

(30) Foreign Application Priority Data
Dec. 30, 2020   (CN) .......................... 202011601988.9

(51) Int. Cl.
*G06F 9/4401*    (2018.01)
(52) U.S. Cl.
CPC .................................. *G06F 9/441* (2013.01)
(58) Field of Classification Search
CPC ................................ G06F 9/441; G06F 9/445
See application file for complete search history.

(56) References Cited

U.S. PATENT DOCUMENTS

| | | | | |
|---|---|---|---|---|
| 6,560,726 | B1* | 5/2003 | Vrhel, Jr. | G06F 11/0757 |
| | | | | 714/E11.003 |
| 2008/0229158 | A1* | 9/2008 | Saito | G06F 11/0757 |
| | | | | 714/E11.004 |
| 2016/0357963 | A1* | 12/2016 | Sherman | G06F 21/575 |
| 2017/0322816 | A1* | 11/2017 | Parthiban | G06F 9/4416 |
| 2018/0300202 | A1* | 10/2018 | Lambert | G06F 9/4405 |
| 2020/0159302 | A1* | 5/2020 | Chaiken | G06F 1/24 |

FOREIGN PATENT DOCUMENTS

CN           109471670 A        3/2019

* cited by examiner

*Primary Examiner* — Hyun Soo Kim
(74) *Attorney, Agent, or Firm* — ANOVA LAW GROUP, PLLC

(57) ABSTRACT

An information processing method includes performing a first boot operation, determining an execution time of the first boot operation and an execution time of a second boot operation before the first boot operation, in response to determining that an interval between the execution time of the first boot operation and the execution time of the second boot operation does not reach a first threshold, determining whether a call number of a first mirror image file before performing the first boot operation has reached a second threshold, and in response to determining that the call number of the first mirror image file before performing the first boot operation has not reached the second threshold, calling the first mirror image file.

10 Claims, 3 Drawing Sheets

INFORMATION PROCESSING METHOD AND ELECTRONIC APPARATUS

CROSS-REFERENCE TO RELATED APPLICATION

This application claims priority to Chinese Patent Application No. 202011601988.9, filed on Dec. 30, 2020, the entire content of which is incorporated herein by reference.

TECHNICAL FIELD

The present disclosure generally relates to the electronic apparatus technology field and, more particularly, to an information processing method and an electronic apparatus.

BACKGROUND

To improve system stability and security, a baseboard management controller ("BMC") usually includes a primary mirror image file and a backup mirror image file. When a U-boot is started, the primary mirror image file is called first to start an operating system corresponding to the primary mirror image file. When the primary mirror image file fails to start, a Watchdog automatically restarts the primary mirror image file, and the call number of the primary mirror image file is increased by 1. When the primary mirror image file fails to start repeatedly, which causes the call number of the primary mirror image file to reach a certain threshold, the U-boot calls the backup mirror image file instead to start the operating system corresponding to the backup mirror image file to ensure that the baseboard management controller will be started. In this process, the operating system corresponding to the primary mirror image file may fail repeatedly due to frequent power on and off, which is not a problem of the primary mirror image file. In this situation, the U-boot unnecessarily turns to boot the operating system through the backup mirror image file.

SUMMARY

Embodiments of the present disclosure provide an information processing method. The method includes performing a first boot operation, determining an execution time of the first boot operation and an execution time of a second boot operation before the first boot operation, in response to determining that an interval between the execution time of the first boot operation and the execution time of the second boot operation does not reach a first threshold, determining whether a call number of a first mirror image file before performing the first boot operation has reached a second threshold, and in response to determining that the call number of the first mirror image file before performing the first boot operation has not reached the second threshold, calling the first mirror image file.

Embodiments of the present disclosure provide an electronic apparatus, including an execution module, a first determination module, a second determination module, and a call module. The execution module is configured to perform a first boot operation. The first determination module is configured to determine an execution time of the first boot operation and an execution time of a second boot operation before the first boot operation. The second determination module is configured to, in response to determining that an interval between the execution time of the first boot operation and the execution time of the second boot operation does not reach a first threshold, determine whether a call number of a first mirror image file before performing the first boot operation has reached a second threshold. The call module is configured to, in response to determining that the call number of the first mirror image file before performing the first boot operation has not reached the second threshold, call the first mirror image file.

DETAILED DESCRIPTION OF THE EMBODIMENTS

Figure 1:
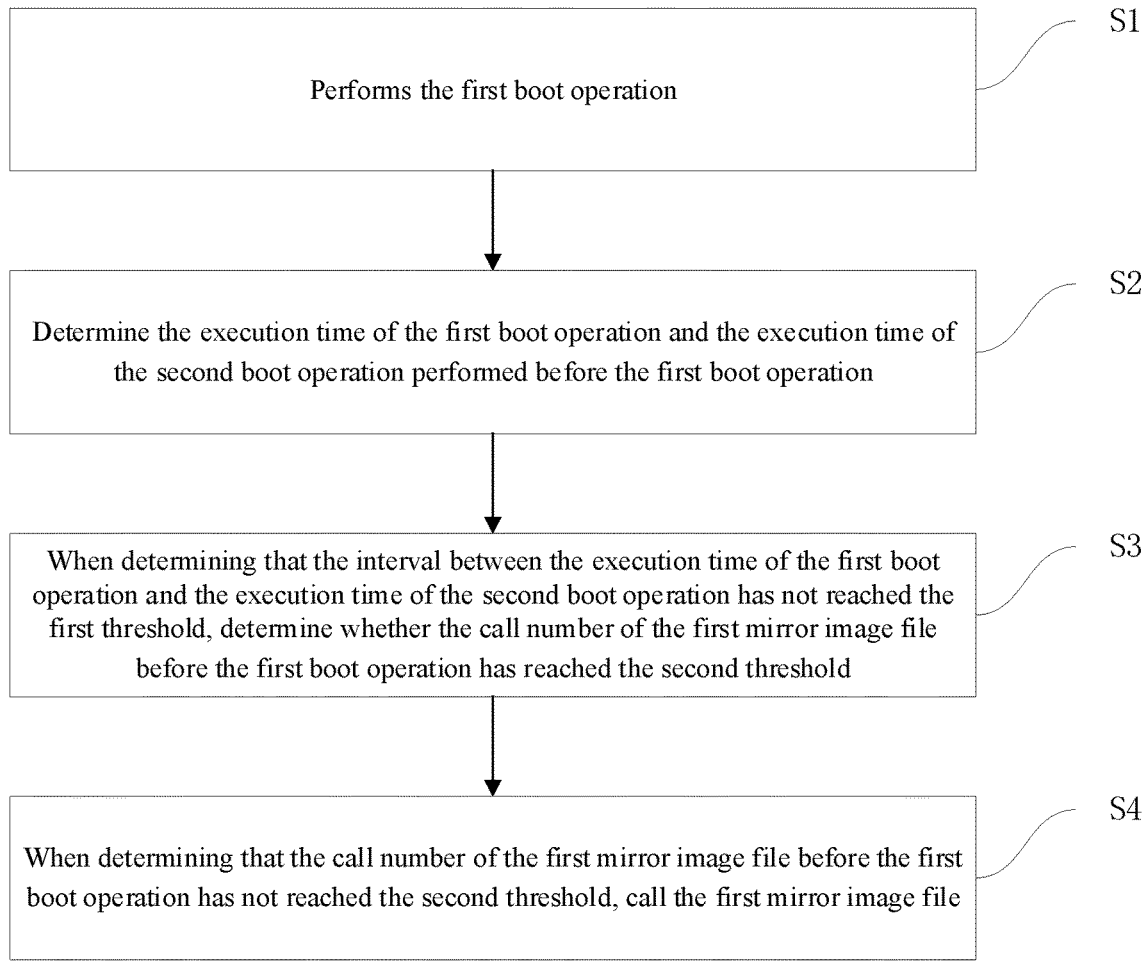
FIG. 1 illustrates a schematic flowchart of an information processing method according to some embodiments of the present disclosure.

The technical solutions and features of the present disclosure are described according to the accompanying drawings.

Various modifications may be made to embodiments of the present disclosure. Therefore, the present description should not be regarded as a limitation but merely as an example of embodiments of the present disclosure. Those skilled in the art may think of other modifications within the scope and spirit of the present disclosure.

The drawings included in the specification and constituting a portion of the specification illustrate embodiments of the present disclosure. The drawings and the general description of the present disclosure mentioned above and the detailed description of embodiments below are used to explain the principle of the present disclosure.

Some embodiments of the non-restrictive examples are described according to the accompanying drawings. Features of the present disclosure may become obvious.

Although the present disclosure has been described with reference to some specific examples, those skilled in the art may implement many other equivalent forms of the present disclosure.

The above and other aspects, features, and advantages of the present disclosure may become more obvious in connection with the accompanying drawings.

Embodiments of the present disclosure may be described with reference to the accompanying drawings. However, embodiments of the present disclosure are merely examples of the present application, which may be implemented by various methods. Well-known and/or repeated functions and structures have not been described in detail to avoid unnecessary or redundant details from obscuring the present disclosure. Therefore, the specific structural and functional details are not intended to limit the present disclosure but merely serve as the basis and representative basis of the claims to teach those skilled in the art to use the present disclosure in a variety of ways with substantially any suitable detailed structure.

In the specification, the terms "in one embodiment," "in another embodiment," "in yet another embodiment," or "in other embodiments" may all refer to one or more of the same or different embodiments of the present disclosure.

Embodiments of the present disclosure provide an information processing method. The method includes performing a first boot operation, determining execution time of the first boot operation and execution time of a second boot operation performed before the first boot operation, when an interval between the execution time of the first boot operation and the execution time of the second boot operation is determined to not reach a first threshold, determining whether a call number of a first mirror image file before the first boot operation has reached a second threshold, and when the call number of the first mirror image file before the first boot operation has not reached the second threshold, calling the first mirror image file.

In the information processing method of embodiments of the present disclosure, when the first boot operation is performed, the call number of the first mirror image file may not directly be accumulated. First, the execution time of the first boot operation and the execution time of the second boot operation performed before the first boot operation may be determined. When the interval between the execution time of the first boot operation and the execution time of the second boot operation has not reached the first threshold, the interval time between the first boot operation and the second boot operation may not be sufficient for indicating that a startup process has reached a startup phase for booting the system using a mirror image file. Thus, the startup failure of the second boot operation may be determined to not be caused by a failure of the first mirror image file. The call number of the first mirror image file may not be accumulated. Whether the call number of the first mirror image file has reached the second threshold may be determined based on the call number of the first mirror image file of a previous boot operation before the first boot operation. If the call number of the first mirror image file has not reached the second threshold, the first mirror image file may be continuously called. As such, accumulation of the call number caused by the startup failure due to a root failure of the primary mirror image file may be avoided. Thus, the backup mirror image file may be avoided to boot the system when the primary mirror image file does not have failure.

Specific steps and principles of the information processing method of embodiments of the present disclosure may be described in detail below in connection with some embodiments and accompanying drawings.

FIG. 1 illustrates a schematic flowchart of an information processing method according to some embodiments of the present disclosure. As shown in FIG. 1, the information processing method of embodiments of the present disclosure includes the following steps.

At S1, an electronic apparatus performs the first boot operation.

The first boot operation may be used in a startup process of the system of the electronic apparatus. The system may include an operating system or management system of the electronic apparatus. In some embodiments, the first boot operation may be used to start a boot program. The electronic apparatus may call a mirror image file through the boot program to start the system of the electronic apparatus. The first boot operation may be executed in response to a user operation on the electronic apparatus or a start instruction sent by another electronic apparatus.

At S2, the electronic apparatus determines the execution time of the first boot operation and the execution time of the second boot operation performed before the first boot operation.

The first boot operation may include a present boot operation that is currently executed. The second boot operation may include a boot operation before the first boot operation or N boot operations before the first boot operation.

In some embodiments, the electronic apparatus may determine the execution time of the first boot operation and the execution time of the second boot operation based on history information. For example, when the first boot operation is performed, a first time-stamp indicating the execution time of the first boot operation may be generated. Similarly, when the second boot operation is performed, a second time-stamp indicating the execution time of the second boot operation may be generated. The execution time of the first boot operation and the execution time of the second boot operation may be determined based on the first time-stamp and the second time-stamp. A plurality of methods may be used to record the execution time of the first boot operation and the execution time of the second boot operation, which is not limited to the form of the time-stamp.

In addition to boot the startup program, the first boot operation may be used to boot a monitor. The monitor may be configured to determine the execution time of the first boot operation based on the first time-stamp. The monitor may also be configured to determine the execution time of the second boot operation based on the second time-stamp. In some embodiments, the monitor may include a monitor program or a monitor chip, such as a Watchdog chip.

At S3, when determining that the interval between the execution time of the first boot operation and the execution time of the second boot operation has not reached the first threshold, the electronic apparatus determines whether the call number of the first mirror image file before the first boot operation has reached the second threshold.

The startup process may include a plurality of startup phases. Calling the first mirror image file may be one phase of the plurality of phases. There may be one or more startup phases before calling the first mirror image file. That is, calling the first mirror image file may not be a first startup phase of the startup process. Taking a startup process of Linux operating system as an example, the startup process may usually include a plurality of startup phases such as hardware initialization, execution of a startup loading program, loading and starting of Linux kernel mirror image, and execution of startup scripts and daemons. Before the loading and starting of the Linux kernel mirror image, the startup process may also include two startup phases of the hardware initialization and execution of the startup loading program. Usually, each startup phase may take up a specific execution time. The execution time may be different depending on a configuration of an apparatus. The first threshold may include the execution time required for one or more startup phases before calling the first mirror image file.

When the execution time of the first boot operation and the execution time of the second boot operation is determined, whether the interval between the execution time of the first boot operation and the execution time of the second boot operation has reached the first threshold may be determined. If the interval has not reached the first threshold, the startup process that is triggered by the previous boot operation may be failed before proceeding to the startup phase of calling the first mirror image file and fails. The failure to boot the electronic apparatus by the previous boot operation may not be caused by the failure of the first mirror image file.

Thus, the call number of the first mirror image file may not be accumulated. In some embodiments, whether the accumulated call number of the first mirror image file until the boot operation before the first boot operation has reached the second threshold may be determined. The second threshold may include the call number of the first mirror image file indicating that the first mirror image file cannot startup due to failures. The second threshold may be determined based on experiment tests or practical experience. In some embodiments, the call number of the first mirror image file may be recorded in the history information as a parameter of the history information. The monitor may also be configured to perform an operation of determining whether the call number has reached the second threshold.

At S4, when determining that the call number of the first mirror image file before the first boot operation has not reached the second threshold, the electronic apparatus calls the first mirror image file.

When the electronic apparatus determines that the accumulated call number of the first mirror image file until the boot operation before the first boot operation has not reached the second threshold, the call number of the first mirror image file may not reach the call number that the first mirror image file cannot startup due to failures. The electronic apparatus may continue to boot the first mirror image file to startup the system of the electronic apparatus.

In the information processing method of embodiments of the present disclosure, when the electronic apparatus determines that the interval of the execution time of the first boot operation and the execution time of the second boot operation has not reached the first threshold, the startup process triggered by the boot operation before the first boot operation may have failed before proceeding to the startup phase of calling the first mirror image file. The startup failure of booting the electronic apparatus by the previous boot operation may not be caused by failures of the first mirror image file. The call number of the first mirror image file may not be accumulated. The electronic apparatus may determine whether the accumulated call number until the boot operation before the first boot operation has reached the second threshold. When determining that the call number of the first mirror image file has not reached the second threshold, the electronic apparatus may continue to try to start the system of the electronic apparatus by booting the first mirror image file. As such, the accumulation of the call number due to the startup failure not caused by the failure of the primary mirror image file may be avoided. Thus, booting the backup mirror image file may be avoided when the primary mirror image file does not have a failure.

Figure 2:
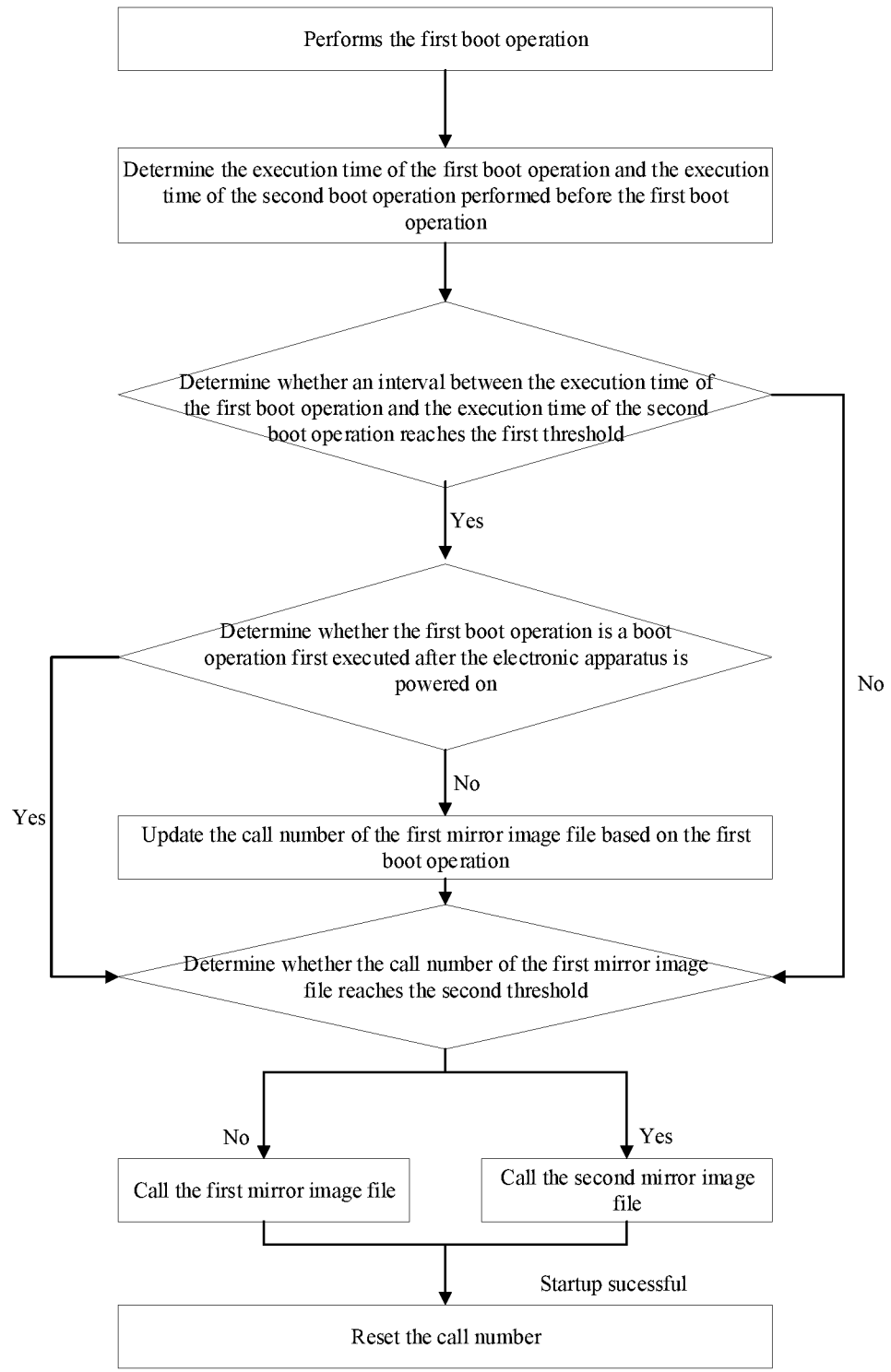
FIG. 2 illustrates a schematic flowchart of an information processing method according to an embodiment of the present disclosure.

As shown in FIG. 2, in some embodiments, the method further includes when determining that the call number of the first mirror image file before performing the first boot operation has reached the second threshold, calling the second mirror image file.

As described above, the second threshold may include the call number indicating that the first mirror image file cannot startup due to failures. When the call number of the first mirror image file before the first boot operation is determined to have reached the second threshold, the first mirror image file may be damaged and cannot boot the system. Thus, the electronic apparatus may call the second mirror image file that is used as the backup mirror image file to try to start the system of the electronic apparatus.

In some embodiments, the first boot operation and the second boot operation may be used to boot a management system of a baseboard management controller. After the startup process is started, the Uboot that is used to boot the management system of the baseboard management controller to start may be started. The electronic apparatus may call the first mirror image file or the second mirror image file through the Uboot to start the management system of the baseboard management controller to cause the baseboard management controller to be more robust.

In some embodiments, the method further may include when determining that the interval of the execution time of the first boot operation and the execution time of the second boot operation has reached the first threshold, updating the call number of the first mirror image file based on the first boot operation.

As described above, the first threshold may include the execution time required by the one or more startup phases before the startup phase of calling the first mirror image file. If the execution time of the first boot operation and the second boot operation has reached the first threshold, the second operation guide may have been executed to the startup phase of calling the first mirror image file. The startup failure of the second boot operation booting the electronic apparatus to start may include the first mirror image file being damaged. Thus, the call number of the first mirror image file may be updated, that is, accumulated. Then, the electronic apparatus may determine whether the call number has reached the second threshold based on the updated call number. If the call number has not reached the second threshold, the electronic apparatus may continue to call the first mirror image. If the call number has reached the second threshold, the electronic apparatus may call the second mirror image. As such, the startup failure of the program or apparatus booted by the second boot operation may be caused by the damage of the first mirror image file. The call number may be accumulated. When one mirror image file is damaged, another mirror image file may be called to ensure the program or apparatus to start smoothly.

As shown in FIG. 2, in some embodiments, the method further includes when determining that the interval of the execution time of the first boot operation and the execution time of the second boot operation has reached the first threshold, determining whether the first boot operation is a boot operation first executed after the electronic apparatus is powered up. The method further includes when determining that the first boot operation is the boot operation first executed after the electronic apparatus is powered up, continuing to determine whether the call number of the first mirror image file has reached the second threshold before executing the first boot operation.

If the interval of the execution time of the first boot operation and the second boot operation has reached the first threshold, the second boot operation may have been executed to the startup phase of calling the first mirror image file. The startup failure of the program or apparatus booted by the second boot operation may be caused by the damage of the first mirror image file. However, the startup failure may not be completely determined to have been caused by the damage of the first mirror image file. The startup failure may be caused by the power failure of the electronic apparatus. Thus, to further exclude the startup failure caused by the power failure of the electronic apparatus, when the interval of the execution time of the first boot operation and the execution time of the second boot operation has reached the first threshold, the electronic apparatus may further determine whether the first boot operation is the boot operation first executed after the electronic apparatus is powered up. If the first boot operation is the boot operation first executed after the electronic apparatus is powered up, it may indicate that before executing the first boot operation the electronic powered has the powered failure. The failure of the previous boot operation may be caused by the power failure. Thus, the call number of the first mirror image file may not be accumulated. The electronic apparatus may determine whether the call number of the first mirror image file before executing the first boot operation has reached the second threshold. If the call number has not reached the second threshold, the electronic apparatus may call the first mirror image file. If the call number has reached the second threshold, the electronic apparatus may call the second mirror image.

In some embodiments, the electronic apparatus may determine whether the first boot operation is the boot operation first executed after the electronic apparatus is powered up by detecting whether a Power on reset outputs a reset signal. The Power on reset may be configured to generate the reset signal when the electronic apparatus is re-powered up to reset a logic circuit and a control circuit of the electronic apparatus to an initial state. Thus, a logical failure may be avoided. Therefore, the electronic apparatus may determine whether the first boot operation is the boot operation first executed after the electronic apparatus is powered up by detecting whether a Power on reset outputs a reset signal.

In some embodiments, The Power on reset may include a capacitor and a resistor. An end of the capacitor may be connected to a DC power source. Another end of the capacitor may be connected to the resistor. An end of the resistor may be grounded. A reset signal output terminal may be connected between the capacitor and the resistor. At a moment when the electronic apparatus is powered on, the capacitor may be charged, the reset signal terminal may have a current flowing. The reset signal output terminal may be a high-level (e.g., high current level, high voltage level, etc.) to generate a high-level reset signal. When the voltage across the capacitor has reached the power source voltage, the charging of the capacitor is completed. No current flows through the reset signal output terminal. The reset signal output terminal is a low-level (e.g., low current level, low voltage level, etc.), and no reset signal is generated.

In some embodiments, the method may further include when determining that the first boot operation is not the boot operation first executed after the electronic apparatus is powered on, updating the call number of the first mirror image file based on the first boot operation.

When the electronic apparatus determines that the interval between the execution time of the first boot operation and the execution time of the second boot operation has reached the first threshold, and the first boot operation is not the boot operation first executed after the electronic apparatus is powered on, it may indicate that the startup process of the previous boot operation may have been executed to the startup phase of calling the first mirror image file. The startup failure due to the power failure of the electronic apparatus may be excluded. Since the probability of the damage of the first mirror image file causing the startup failure is relatively large, the call number of the first mirror image file may be updated based on the first boot operation. The electronic apparatus may determine whether the call number has reached the second threshold based on the updated call number. If the call number has not reached the second threshold, the electronic apparatus may continue to call the first mirror image file. If the call number has reached the second threshold, the electronic apparatus may call the second mirror image file to ensure the electronic apparatus to be started normally.

In some embodiments, the method may further include resetting the call number of the first mirror image file based on a situation of completion of the startup of the first mirror image file.

As such, the accumulation of the call number caused by a plurality of normal startups of the first mirror image file may be avoided. Thus, the second mirror image file may not boot the system when the first mirror image file is not damaged.

When the system of the electronic apparatus is started based on the second mirror image file, the call number of the first mirror image file may be reset.

Figure 3:
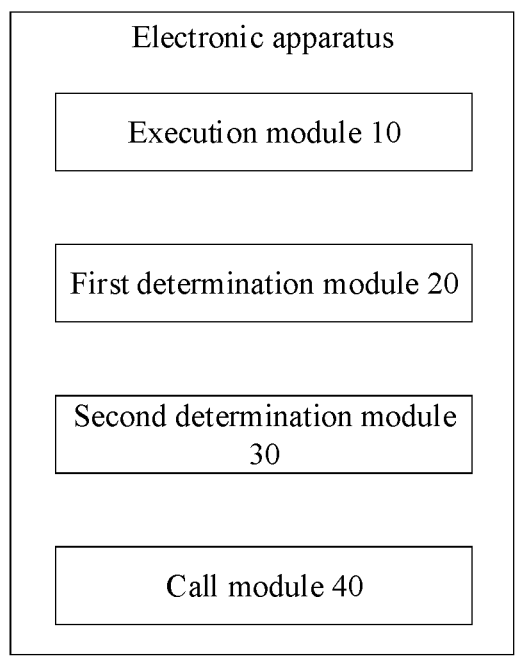
FIG. 3 illustrates a schematic structural block diagram of an electronic apparatus according to some embodiments of the present disclosure.

As shown in FIG. 3, embodiments of the present disclosure further provide an electronic apparatus. The electronic apparatus includes an execution module 10, which is configured to execute the first boot operation.

The first boot operation may be used for the startup process of the system of the electronic apparatus. The system may include the operating system or management system of the electronic apparatus. In some embodiments, the first boot operation may be used to start a boot program. The electronic apparatus may call the mirror image file through the boot program to start the system of the electronic apparatus. The first boot operation may be executed in response to the operation that is performed by the user on, e.g., the electronic apparatus or the startup instruction sent by another electronic apparatus.

The electronic apparatus further includes a first determination module 20, which may be configured to determine the execution time of the first boot operation and the execution time of the second boot operation before the first boot operation.

The first boot operation may be used as a present boot operation that is currently executed. The second boot operation may be used a boot operation before the first boot operation or N boot operations before the first boot operation.

In some embodiments, the electronic apparatus may determine the execution time of the first boot operation and the execution time of the second boot operation. For example, when the first boot operation is performed, the first time-stamp indicating the execution time of the first boot operation may be generated. Similarly, when the second boot operation is performed, the second time-stamp indicating the execution time of the second boot operation may be generated. The electronic apparatus may determine the execution time of the first boot operation and the execution time of the second boot operation based on the first time-stamp and the second time-stamp. A plurality of methods may be used to record the execution time of the first boot operation and the execution time of the second boot operation, which is not limited to the form of the time-stamp.

In addition to boot the startup program, the first boot operation may be used to boot a monitor. The monitor may be configured to determine the execution time of the first boot operation based on the first time-stamp and the execution time of the second boot operation based on the second time-stamp. In some embodiments, the monitor may include a monitor program or a monitor chip, such as a Watchdog chip.

The electronic apparatus further includes a second determination module 30. The second determination module 30 may be configured to determine whether the call number of the first mirror image file before the first boot operation is executed has reached the second threshold when determining that the interval between the execution time of the first boot operation and the execution time of the second boot operation has not reached the first threshold.

The startup process may include a plurality of startup phases. Calling the first mirror image file may be one startup phase of the plurality of startup phases. One or more startup phases may be before calling the first mirror image file. That is, calling the first mirror image file may not be the first startup phase of the startup process. Taking a startup process of Linux operating system as an example, the startup process may usually include a plurality of startup phases such as hardware initialization, execution of a startup loading program, loading and starting of Linux kernel mirror image, and execution of startup scripts and daemons. Before the loading and starting of the Linux kernel mirror image, the startup process may also include two startup phases of the hardware initialization and execution of the startup loading program. Usually, each startup phase may take up a specific execution time. The execution time may be different depending on a configuration of an apparatus. The first threshold may include the execution time required for one or more startup phases before calling the first mirror image file.

After determining the execution time of the first boot operation and the execution time of the second boot operation, the electronic apparatus may determine whether the interval between the execution time of the first boot operation and the execution time of the second boot operation has reached the first threshold. If the interval has reached the first threshold, the startup process started by the previous boot operation may fail before calling the first mirror image file. The startup failure of the electronic apparatus booted by the previous boot operation may not be caused by the failure of the first mirror image file.

Thus, the call number of the first mirror image file may not be accumulated. The electronic apparatus may determine whether the call number that is accumulated until the boot operation before the first boot operation has reached the second threshold. The second threshold may include the call number that the first mirror image file cannot start due to a failure. The second threshold may be determined based on experiment tests or practical experience. In some embodiments, the call number of the first mirror image file may be used as a parameter of the history information and recorded in the history information. The monitor may also be configured to perform the operation of determining whether the call number has reached the second threshold.

The electronic apparatus further includes a call module 40. The call module 40 may be configured to, when the electronic apparatus determines that the call number of the first mirror image file before calling the first boot operation has not reached the second threshold, call the first mirror image file.

When the electronic apparatus determines that the call number accumulated until the boot operation before the first boot operation has not reached the second threshold, the call number of the first mirror image file may not reach the call number that the electronic apparatus can determine that the first mirror image file cannot be started due to the failure. Thus, the electronic apparatus may continue to try to start the system of the electronic apparatus through the first mirror image file.

The electronic apparatus of embodiments of the present disclosure may determine that the interval of the execution time of the first boot operation and the execution time of the second boot operation has not reached the first threshold. Thus, the startup process started by the boot operation before the first boot operation may have failed before proceeding to the startup phase of calling the first mirror image file. The startup failure of the electronic apparatus booted by the previous boot operation may not be caused by the failure of the first mirror image file. Thus, the call number of the first mirror image file may not be accumulated. The electronic apparatus may determine whether the call number has reached the second threshold based on the call number accumulated until the boot operation before the first boot operation. When determining that the call number has not reached the second threshold, the electronic apparatus may continue to try to start the system the electronic apparatus by booting the first mirror image file. As such, the accumulation of the call number due to the startup failure not due to the failure of the primary mirror image file may be avoided. Thus, the backup mirror image file may not boot the system when the primary mirror image file does not have a failure.

In some embodiments, the electronic apparatus may further include an updating module. The updating module may be configured to, when the electronic apparatus determines that the interval of the execution time of the first boot operation and the execution time of the second boot operation has reached the first threshold, update the call number of the first mirror image file based on the first boot operation.

In some embodiments, the call module 40 may be further configured to, when the electronic apparatus determines that the call number of the first mirror image file before performing the first boot operation has reached the second threshold, call the second mirror image file.

In some embodiments, the electronic apparatus may be configured to call the first mirror image file or the second mirror image file of the baseboard management controller through the Uboot used to boot the baseboard management controller to start the baseboard management controller.

In some embodiments, the second determination module 30 may be configured to, when the electronic apparatus determines that the interval between the execution time of the first boot operation and the execution time of the second boot operation has reached the first threshold, determine whether the first boot operation is the first boot operation executed after the electronic apparatus is powered on. The second determination module 30 may further be configured to when the electronic apparatus determines that the first boot operation is the first boot operation after the electronic apparatus is powered on, continue to determine whether the call number of the first mirror image file before executing the first boot operation has reached the second threshold.

In some embodiments, the call module 40 may be further configured to, when the electronic apparatus determines that the first boot operation is not the boot operation first executed after the electronic apparatus is powered on, update the call number of the first mirror image file based on the first boot operation.

In some embodiments, the electronic apparatus may further include a reset module. The reset module may be configured to, when the startup of the first mirror image file is completed, reset the call number of the first mirror image file.

The above embodiments are merely exemplary embodiments of the present disclosure and are not used to limit the present disclosure. The scope of the present invention may be defined by the claims. Those of skill in the art may make various modifications and equivalent replacements to the present disclosure within the essence and scope of the present disclosure. These modifications and equivalent replacements should be within the scope of the present disclosure.

What is claimed is:
1. An information processing method, comprising:
performing a first boot operation;
determining an execution time of the first boot operation and an execution time of a second boot operation before the first boot operation;

in response to determining that an interval between the execution time of the first boot operation and the execution time of the second boot operation is less than a threshold time interval;
  determining whether a call number of a first mirror image file before performing the first boot operation has reached a threshold call number; and
  in response to determining that the call number of the first mirror image file before performing the first boot operation has not reached the threshold call number, calling the first mirror image file; and
in response to determining that the interval between the execution time of the first boot operation and the execution time of the second boot operation has reached the threshold time interval and that the first boot operation is not a boot operation first executed after an electronic apparatus is powered on:
  updating the call number of the first mirror image file based on the first boot operation;
  determining whether the updated call number of the first mirror image file has reached the threshold call number; and
  in response to determining that the updated call number of the first mirror image file has not reached the threshold call number, calling the first mirror image file.

2. The method of claim 1, further comprising:
in response to determining that the call number of the first mirror image file before performing the first boot operation has reached the threshold call number, calling a second mirror image file.

3. The method of claim 2, further comprising:
calling the first mirror image file or the second mirror image file of a baseboard management controller through an Uboot for booting the baseboard management controller.

4. The method of claim 1, further comprising:
in response to determining that the interval between the execution time of the first boot operation and the execution time of the second boot operation has reached the threshold time interval, and that the first boot operation is the boot operation first executed after the electronic apparatus is powered on,
  continuing to determine whether the call number of the first mirror image file before performing the first boot operation has reached the threshold call number.

5. The method of claim 1, further comprising:
resetting the call number of the first mirror image file in response to the start of the first mirror image file being completed.

6. An electronic apparatus, comprising:
a baseboard management controller configured to perform a first boot operation; and
a monitor chip configured to:
  determine an execution time of the first boot operation and an execution time of a second boot operation before the first boot operation;
  in response to determining that an interval between the execution time of the first boot operation and the execution time of the second boot operation is less than a threshold time interval, determine whether a call number of a first mirror image file before performing the first boot operation has reached a threshold call number, wherein the first mirror image is called to start the electronic apparatus in response to determining that the call number of the first mirror image file before performing the first boot operation has not reached the threshold call number; and
  in response to determining that the interval between the execution time of the first boot operation and the execution time of the second boot operation has reached the threshold time interval and that the first boot operation is not a boot operation first executed after the electronic apparatus is powered on, determine whether an updated call number of the first mirror image file has reached the threshold call number,
  wherein the updated call number being a call number of the first mirror image file updated based on the first boot operation, wherein the first mirror image is called to start the electronic device—in response to determining that the updated call number of the first mirror image file has not reached the threshold call number.

7. The electronic apparatus of claim 6, wherein in response to determining that the call number of the first mirror image file before performing the first boot operation has reached the threshold call number, a second mirror image file is called to start the electronic apparatus.

8. The electronic apparatus of claim 7, wherein the first mirror image file or the second mirror image file of the baseboard management controller is called through a Uboot for booting the baseboard management to start the baseboard management controller.

9. The electronic apparatus of claim 6, wherein the monitor chip is further configured to:
  in response to determining that the interval between the execution time of the first boot operation and the execution time of the second boot operation has reached the threshold time interval and that the first boot operation is the boot operation first executed after the electronic apparatus is powered on, continue to determine whether the call number of the first mirror image file before performing the first boot operation has reached the threshold call number.

10. The electronic apparatus of claim 6, wherein:
the call number of the first mirror image file is reset in response to the start of the first mirror image file being completed.

* * * * *